United States Patent [19]

Balog et al.

[11] Patent Number: 4,937,039

[45] Date of Patent: Jun. 26, 1990

[54] FOUR PIN MOUNTING SYSTEM FOR NUCLEAR REACTOR CONTROL ROD GUIDE TUBES

[75] Inventors: Leonard J. Balog, Export; David E. Boyle, Spring Church, both of Pa.

[73] Assignee: Westinghouse Electric Corp., Pittsburgh, Pa.

[21] Appl. No.: 298,598

[22] Filed: Jan. 17, 1989

[51] Int. Cl.$^5$ .............................................. G21C 19/00
[52] U.S. Cl. .................................................... 376/353
[58] Field of Search ............... 376/353, 260, 261, 449, 376/463; 29/906, 723, 402.03, 402.08

[56] References Cited

U.S. PATENT DOCUMENTS

| | | | |
|---|---|---|---|
| 3,481,832 | 12/1969 | Rickert | 376/353 |
| 3,849,257 | 11/1974 | Bevilacqua | 376/353 |
| 3,940,311 | 2/1976 | Frisch et al. | 376/353 |
| 4,036,692 | 7/1977 | Walton . | |
| 4,092,216 | 5/1978 | Aubert . | |
| 4,173,513 | 11/1979 | Obermeyer et al. . | |
| 4,231,843 | 11/1980 | Myron et al. . | |
| 4,347,966 | 9/1982 | Feutrel . | |
| 4,416,848 | 11/1983 | Feutrel . | |
| 4,562,038 | 12/1985 | Assedo et al. . | |
| 4,585,613 | 4/1986 | Styskal et al. . | |
| 4,702,880 | 10/1987 | Porowski et al. . | |
| 4,720,898 | 1/1988 | Calfo et al. . | |
| 4,770,846 | 9/1988 | Land et al. | 376/353 |

FOREIGN PATENT DOCUMENTS

| | | |
|---|---|---|
| 0098774 | 1/1984 | European Pat. Off. . |
| 0152207 | 8/1985 | European Pat. Off. . |
| 0222373 | 5/1987 | European Pat. Off. . |
| 0229029 | 7/1987 | European Pat. Off. . |
| 59-31483 | 2/1984 | Japan . |
| 59-77381 | 5/1984 | Japan . |
| 2157060 | 10/1987 | United Kingdom . |

OTHER PUBLICATIONS

Publication entitled "Dealing with Control Rod Guide Tube Support Pin Cracking in French PWR's", NEI 11/84, pp. 29-34.
Publication entitled "Rapid Replacement for Surrey Guide Tube Support Pins", NEI, 6/85, p. 19.

Primary Examiner—Daniel Wasil
Attorney, Agent, or Firm—W. S. Stevens

[57] ABSTRACT

A mounting system for removably mounting the lower flange of the control rod guide tube over an opening in the upper core plate of a nuclear reactor is disclosed. The system includes a pair of resilient pin members and a pair of reinforcing pin members. The resilient pin members are mounted in a passage formed through first opposing sides of the guide tube lower flange. They are resiliently receivable in first bores formed on first opposing sides of the upper core plate to permit deflection thereof when the guide tube is subject to normal shear loads. The resilient pin members bear substantially all of the normal shear load to which the guide tube is subjected. The reinforcing pin members are mounted on the second opposing side of the guide tube lower flange. They are receivable in second bores formed on the second opposing sides of the upper core plate with a clearance. The reinforcing pin members bear substantially all of the abnormal shear load that exceeds the normal shear load. The clearance between the reinforcing pin members and the second bores limits the deflection of the resilient pin members. After the resilient pin members deflect the distance limited by the clearance, the reinforcing pin members bear any additional abnormal shear loads and prevent the additional abnormal shear loads from bearing on the resilient pin members.

39 Claims, 3 Drawing Sheets

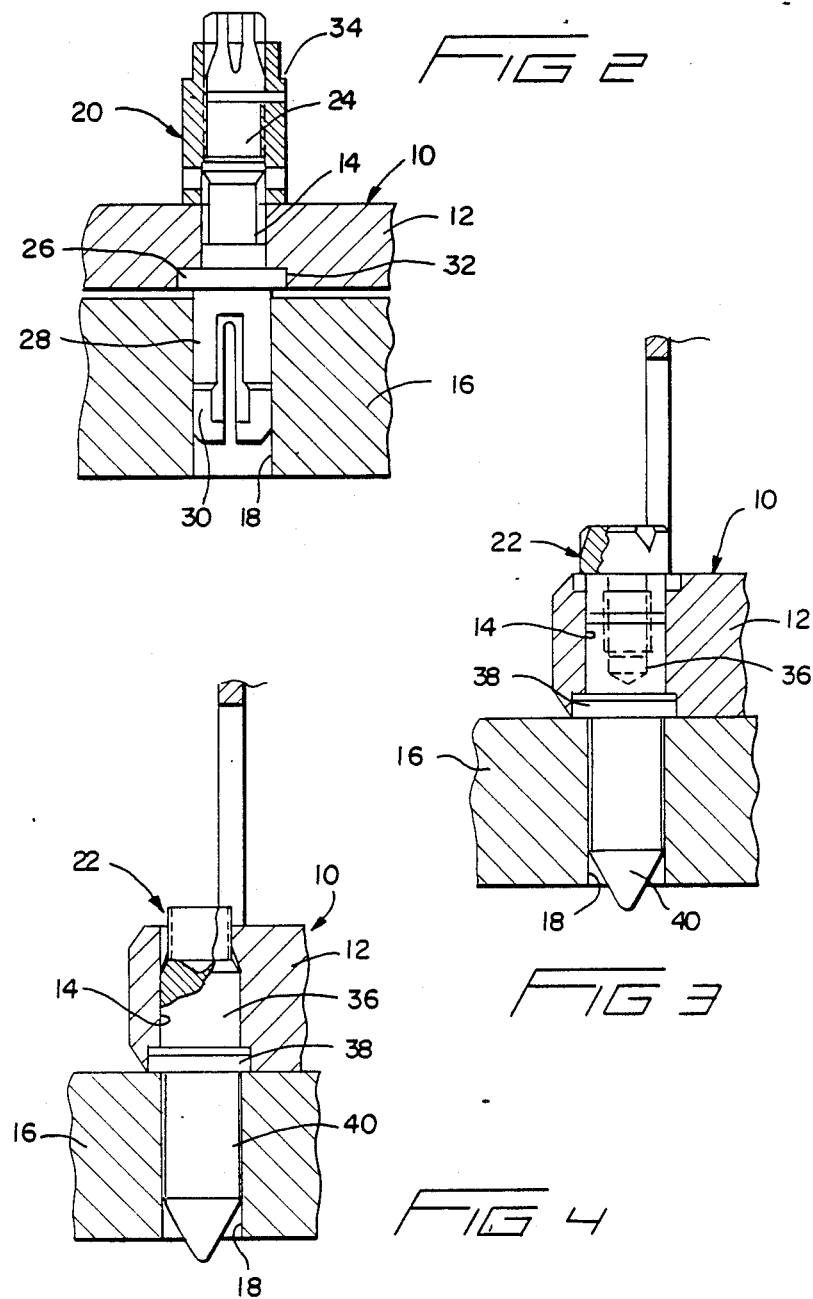

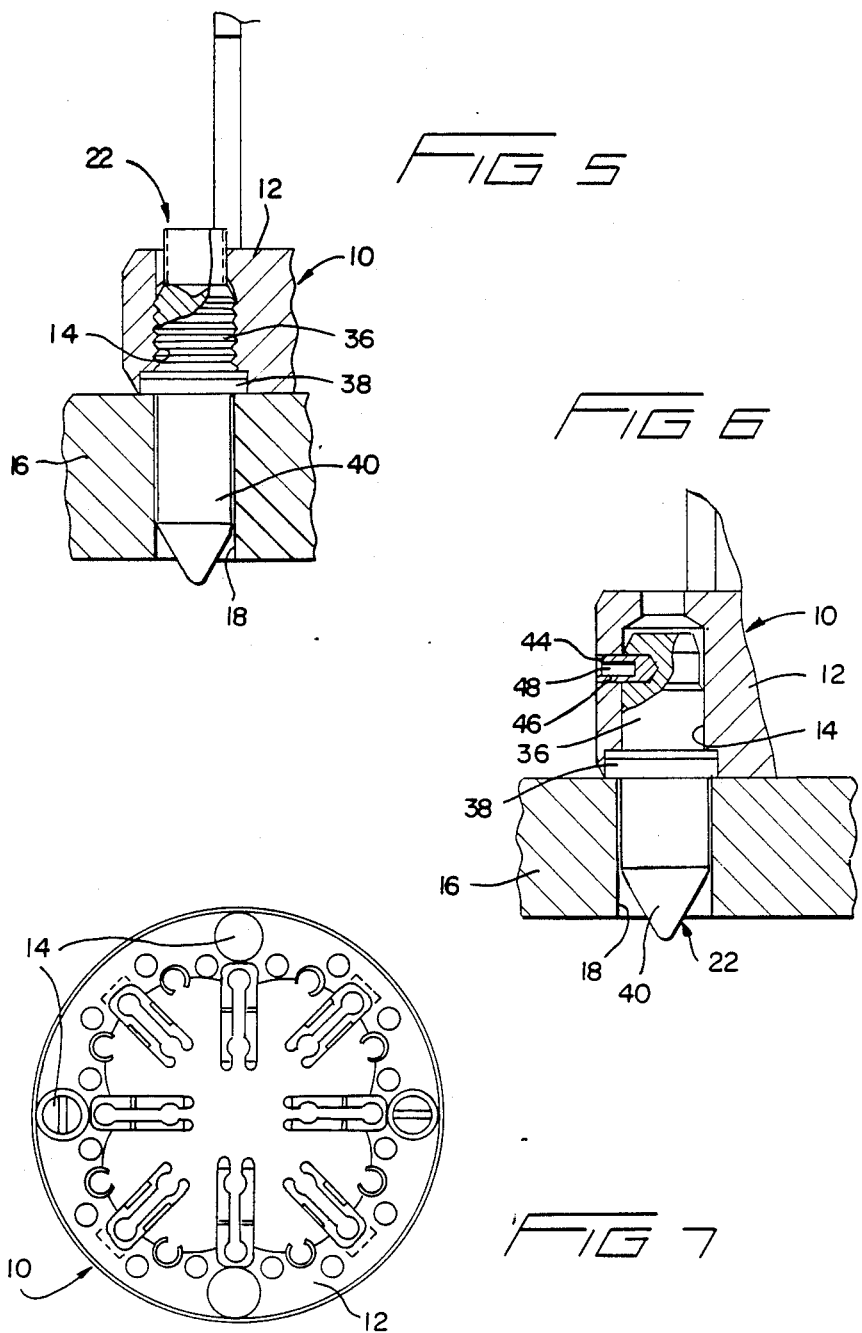

FOUR PIN MOUNTING SYSTEM FOR NUCLEAR REACTOR CONTROL ROD GUIDE TUBES

TECHNICAL FIELD

The present invention relates to a mounting system for removably mounting control rod guide tubes to the upper core plate in a nuclear reactor. More particularly, the present invention relates to a mounting system using four stainless steel pins—two resilient pins and two reinforcing pins.

BACKGROUND OF THE INVENTION

Within a nuclear reactor, the upper boundary of the reactor core is defined by the upper core plate. The upper ends of the nuclear reactor core fuel assemblies are detachably mounted to the undersurface of the upper core plates. The core contains fuel assemblies including fuel rods within which nuclear fuel pellets are disposed. Each fuel assembly has a plurality of tubes which receive nuclear reactor control rods for controlling the power output of the fuel assemblies and the reactor core. Movement of the nuclear reactor control rods is accomplished by control rod drive mechanisms through control rod drive shafts that extend through the pressure vessel.

The nuclear reactor upper support plate is vertically spaced above the upper core plate. An upper plenum chamber is defined between the upper support plate and the upper core plate. Reactor core coolant in the form of water is conducted through the upper plenum chamber for subsequent flow through the reactor core coolant loop and heat exchange system which is external of the pressure vessel and core barrel. The nuclear reactor control rods may be disposed within the upper plenum chamber when they are withdrawn vertically upwardly out of the core; when the control rods are lowered into the core their respective drive shafts are disposed within the upper plenum chamber. Protection and guidance for the control rods and their drive rods within the upper plenum chamber is provided with respect to the cross-currents of the flowing nuclear reactor core coolant by guide tubes. The guide tubes are interposed between, and fixedly connected to, the upper surface of the upper core plate and the upper support plate.

Annular flanges are provided at the lower ends of the guide tubes to secure the guide tubes to the upper core plate. Guide tube retaining pins position the guide tube flanges with respect to the upper core plate. The vertically disposed guide tube retaining pins have lower portions which are frictionally engaged within suitable bores defined within the upper core plate. The upper portion of each guide tube retaining pin is threadedly engaged with an internal hexagonal nut. Counterbored portions of the guide tube flange are engaged between a shoulder portion of the shank and the mated nut of the pin. To prevent retrograde rotation of the nut relative to the retaining pin wherein the nut could become disengaged from the upper portion of the pin, a dowel pin is passed through the nut and welded to a tab which is fixedly secured to the retaining pin.

This guide tube retaining pin and locking system positions the nuclear reactor control rod guide tubes within the upper core plate. However, in some reactors, stress corrosion cracking problems have developed within the retaining pins and weakened them to a point where they must be repaired or replaced by a welding operation. However, because the retaining pin and locking systems are disposed within operating plants and are located in an irradiated, underwater environment, remotely controlled welding operations are extremely difficult to achieve. The small structural components of the retaining pin and locking system, and the confined area within which the welding apparatus must be disposed and the welding operations must be performed contribute to this difficulty. Additionally, underwater welding operations entail high radiation exposure to personnel.

To fully appreciate the difficulties in performing such pin maintenance and repair operations, some understanding of the history of guide tube pin technology is necessary.

Since the inception of the RCCA guide tube concept by Westinghouse Electric Corp. in the mid-1960s, the design objective has been to "pin" the lower end of the guide tube to the upper core plate via two resilient "split pins" that are attached to the guide tube lower flange and which are engaged within circular holes in the core plate. These split pins have leaves that compress as they enter the upper core plate holes and provide a spring compression load to give the guide tube's lower end a degree of end fixity. This permits removal of the guide tube in the event of damage or excessive wear simply by unbolting the upper end where it is attached to the top support plate of the reactor internals and extracting it with a pull force sufficient to overcome the friction generated by the split pin leaf compression.

The material chosen for the split pins has been Inconel* X-750 because of its higher strength and superior mechanical properties (compared to stainless steel), its good wear properties, and the fact that its coefficient of thermal expansion is near that of stainless steel which in turn minimizes stresses caused by differential thermal expansion. The greater strength permits higher specified compressive loads in the leaves to achieve a higher degree of rigidity in the pinned end of the guide tube. In use, two split pins are provided in the lower flange of the guide tube and spaced 180° apart to support the guide tube against the steady state flow and vibratory forces which act on the guide tube during normal plant operation, as well as to resist upset or abnormal loads applied to the tube which could occur during postulated pipe break accidents or earthquake conditions. The split in the two pins is opposed in direction so that each pin provides better restraint in a unique 90° opposed direction.

* Inconel is a U.S. registered trademark owned by the International Nickel Corporation In the late 1970's, stress corrosion began to develop in the Inconel X-750 pins in several nuclear plants. Significant time, money, and effort was spent arriving at a solution to the problem, and eventually, by January of 1988, approximately 60 nuclear facilities had the split pins removed and replaced with new Inconel X-750 split pins having advanced manufacturing and heat treating processes considered sufficient to produce pin longevity.

Unfortunately, Inconel X-750 pins of the new replacement design (which were not manufactured by Westinghouse) have also begun to manifest stress corrosion.

Clearly, there is a need for an improved guide tube pin that is capable of bearing the same shear load as an Inconel pin but which is not susceptible to stress corrosion. Such a pin should be rapidly and easily installable within a reactor core without major replacements to the upper internals and with a minimum of machining operations so as to minimize both the cost of installation and the radiation exposure of the workers. Finally, it would be desirable if the pin were made from relatively inexpensive and easily fabricated material having the same thermal expansion properties as the core plate.

SUMMARY OF THE INVENTION

The mounting system for removably mounting the lower flange of the control rod guide tube over an opening in the upper core plate includes a pair of resilient pin members and a pair of reinforcing pin members.

The resilient pin members are formed of stainless steel and are mounted in a passage formed through first opposing sides of the guide tube lower flange. They are resiliently receivable in first bores formed on first opposing sides of the upper core plate to permit deflection thereof when the guide tube is subject to normal shear loads. The resilient pin members bear substantially all of the normal shear load to which the guide tube is subjected. Each resilient pin member includes a first pin portion extending through the passage and a second resilient pin portion receivable in one of the first bores. The second resilient pin portion includes two leaf members which provide a spring compression load to removably secure the resilient pin member within the first bore of one first opposing side of the upper core plate.

The reinforcing pin members are formed of stainless steel and are mounted on the second opposing side of the guide tube lower flange 90° relative to the resilient pins. They are receivable in second bores formed on the second opposing sides of the upper core plate with a clearance. The clearance is such that the reinforcing pin members do not contact the walls of the second bores when the guide tube is subjected to the usual shear load. The reinforcing pin members reinforce the resilient pin members when the guide tube is subjected to an unusual shear load. The reinforcing pin members bear substantially all of the unusual shear load that exceeds the usual shear load. The clearance between the reinforcing pin members and the second bores limits the deflection of the resilient pin members. After the resilient pin members deflect the distance limited by the clearance, the reinforcing pin members bear any additional abnormal shear loads and prevent the additional abnormal shear loads from bearing on the resilient pin members.

Although this pin system requires new holes to be drilled, the entire reactor upper internals assembly need not be replaced. Additionally, performing a four pin replacement in accordance with the present invention does not require significantly more time than merely replacing existing pins. The necessary alterations to the core plate can be conducted simultaneously with work performed on the guide tubes because the guide tubes are in workstations away from the upper internals and the core plate. The use of stainless steel as the pin material makes the pins relatively easy and inexpensive to fabricate, and minimizes stresses that might be caused by differential thermal expansion between the pins and the core plate. Most importantly, the applicants have observed that the use of stainless steel as a pin material substantially reduces the susceptibility of the pin to stress corrosion.

Lock nuts are disposed on each resilient pin member and each reinforcing pin member to secure the pin members in position.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 2 is a sectional view of a guide tube secured to a core plate with a split pin according to the present invention.

FIG. 3 is a sectional view of a guide tube secured to a core plate with a helper pin according to the present invention.

FIG. 4 is a sectional view of a guide tube secured to a core plate with a helper pin according to another embodiment of the invention.

FIG. 5 is a sectional view of a guide tube secured to a core plate with a helper pin according to another embodiment of the invention.

FIG. 6 is a sectional view of a guide tube secured to a core plate with a helper pin according to another embodiment of the invention.

FIG. 7 is a cross-sectional view of a guide tube showing the location of the split pins and helper pins.

DETAILED DESCRIPTION OF PREFERRED EMBODIMENTS

Figure 1:
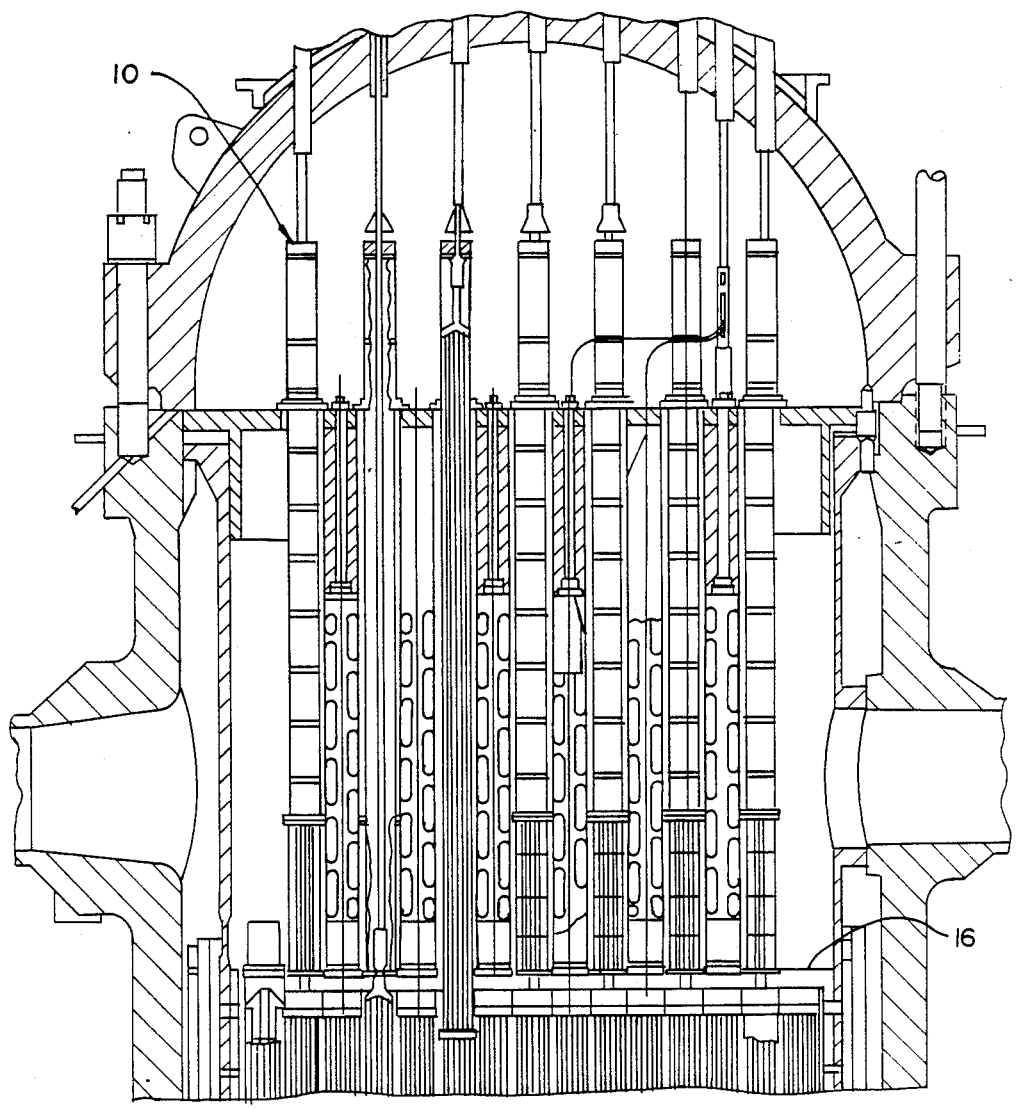
FIG. 1 is a cross-sectional view of a reactor upper internals assembly of a reactor vessel.

As shown in the figures, control rod guide tube 10, having lower flange 12 with passages 14 therethrough, is fastened to upper core plate 16 having a central opening and bores 18. According to the present invention, flange 12 is secured to upper core plate 16 via four pin members. Two resilient pin members 20 are disposed through passages 14 and bores 18 on opposite sides of flange 12 and upper core plate 16, respectively. Two reinforcing pin members 22 are disposed through the remaining opposing passages 14 and bores 18.

Resilient pin members 20 are disposed through existing passages 14 and bores 18. Reinforcing pin members 22 are disposed through newly formed passages 14 and bores 18. All four passages 14 and bores 18 are located on the same bolt circle diameter.

Resilient pin 20 includes upper pin portion 24, intermediate shoulder portion 26, and resilient portion 28. Upper pin portion 24 resides in passage 14 of flange 12. Resilient portion 28, having two leaf members 30, resides in bore 18 of upper core plate 16. Intermediate shoulder portion 26 resides in a counterbore 32 formed in flange 12 around passage 14. Nut 34 is disposed around upper pin portion 24 to secure resilient pin member 20 in position.

Each reinforcing pin member 22 includes upper pin portion 36, intermediate shoulder portion 38, and lower pin portion 40. As with the resilient pin members, upper pin portion 36 resides in passage 14 of flange 12, lower pin portion 40 resides in bore 18 of upper core plate 16, and intermediate shoulder portion resides in counterbore 32. As shown in FIG. 3, reinforcing pin member 22 is formed having a light shrink fit using cap screw retainer 42 with a mechanical locking device. Alternately, as illustrated in FIG. 4, mechanical locking detents integrally formed as part of the pin may be used. In another embodiment shown in FIG. 5, upper pin portion 36 may be threaded and may engage threads formed in passage 14 of flange 12. A mechanical crimp type locking may also be used with this embodiment.

FIG. 6 illustrates still another embodiment of reinforcing pin member 22. This embodiment is preferred. In this configuration, reinforcing pin member 22 engages guide tube flange 12 with a light press fit. After reinforcing pin member 22 is assembled within guide tube flange 12 and upper core plate 16, hole 44 is drilled through flange 12 and upper pin portion 36 to receive reinforcing pin dowel 46. Reinforcing dowel 46 is formed with an axial hole 48 to receive a tool which positions and presses dowel 46 into hole 44 of flange 12 and upper pin portion 36. After dowel 46 is inserted into hole 44, a special reciprocating peening tool prick punches three to five places around hole 44 by upsetting the edge of hole 44 to prevent dowel 46 from exiting hole 44.

In an alternate embodiment, reinforcing pin member is designed as part of upper core plate 16. In this embodiment, reinforcing pin members 22 are fixed and locked to upper core plate 16 and the only new holes required are passages 14 formed in flange 12. In operation of this embodiment reinforcing pin members 22 contact the walls of passages 14 only during abnormal loads. In a final embodiment, reinforcing pin member 22 is part of flange 12 of control rod guide tube 10. In this embodiment, reinforcing pin members 22 are fixed and locked to flange 12 and the only new holes required are bores 18 in core plate 16.

The use of the four pin mounting system of the present invention is as follows. Four non-standard stainless steel pins are used in lieu of the standard of two Inconel X-750 pins at the bottom end of the RCCA guide tube 10 to restrain the guide tube via its engagement with upper core plate 16. Additionally, geometry changes in both the guide tubes and the upper core plate to facilitate the new pins are required. These component modifications may be performed on irradiated hardware, underwater, using remotely operated tools.

The new stainless steel split pins, resilient pin members 20, are the same size, and basically the same configuration as the Inconel X-750 pins which they replace. Hence, they will fit existing bores 18 in core plate 16. However, to provide additional strength and to resist loads on the guide tube, two additional "helper pins," reinforcing pins 22, will be added to lower flange 12 of guide tube 10 on a centerline 90 degrees opposed to the existing pins and on the same bolt circle diameter.

Reinforcing pin members 22 are solid, and occupy two new circular bores 18 in core plate 16 with an existing clearance condition. The Applicants have found that the use of four split pins would require extreme precision and probably unattainable tolerances on the new machined features that would be necessary to avoid the risk of binding or self-locking the guide tube during its installation into the upper core plate. With clearances on reinforcing pin members 22, this risk is removed and installation is essentially similar to existing methods.

The ability to use reinforcing pin members 22 which normally do not contact bores 18 in core plate 16 which they occupy, derives from the following. Under normal operating conditions, direct flow loads and flow-induced vibratory loads are not of a magnitude to overcome the preload in split resilient pin members 20. Resilient pin members 20 are strong enough to resist the loads acting on the guide tube. For steady state, normal cooperating conditions, the designers have shown that pins of the standard size, fabricated from cold worked 316 stainless steel have the mechanical properties necessary to meet this requirement. Two standard, stainless steel pins are generally insufficient where "upset" or "abnormal" conditions exist. These conditions may be caused by coolant pipe breaks, design base earthquakes, and plant transients which cause vibratory and flow loads to increase. For these unusual and rare events, resilient pin members 20 are further compressed, allowing the bottom end of guide tube 10 to move incrementally until reinforcing pin members 22 close their gaps and engage core plate 16, preventing resilient pin members 20 from deforming or stressing further. The clearance between reinforcing pin members 22 and their core plate is selected to guarantee no consequential damage to resilient pin members 20 by not permitting enough deflection to induce yielding or to affect control rod scram capabilities. After the unusual event runs its course, normal load conditions on resilient pin members 20 and clearance on reinforcing pin members 22 are restored. Normal clearances between reinforcing pin member 22 and core plate bore 18 are estimated to be in the range of 0.002 to 0.012 inches radially.

The machining necessary to implement this design is as follows. All existing split pins (Inconel X-750) are removed and replaced in the guide tubes using known tools. (To date, at least twenty plants have had pins replaced with new second generation pins using remote underwater tooling). The replacement resilient pin members are 316 stainless steel of similar design which will fit the existing hole configuration in the guide tube flange. Next, two new holes are added to both the guide tube flange and the upper core plate to receive the reinforcing pin members. To modify every guide tube of a 61 tube fuel assembly, 122 new holes in the flanges and 122 new holes in the core plate need to be bored. However, based on flow tests and load calculations, only the guide tubes situated near reactor outlet nozzles require four pins to offset anticipated loads (approximately 10-20 guide tubes); flow loads peak in these locations, perpendicular to the guide tubes, as flow exits the nozzles at approximately 55 ft/sec. All other tubes have sufficient support with only two stainless steel split pins of the conventional design. Thus the field modification task is significantly reduced. Only 30 holes, using a 15 tube example, need to be machined in the core plate, 30 holes added to the 15 guide tubes, and 30 reinforcing pin members provided.

With the upper reactor internals supported underwater in a storage stand in the reactor cavity, the machining of the necessary 30 additional holes in the upper core plate is accomplished in one of two ways. Special aquatic machine tools created for the task of removing "bent" fuel location pin from the upper core plate are easily adaptable to machine two additional holes at every guide tube location. With the guide tube removed, a special fixture is inserted downwardly into the upper internals and is located over the proposed site of machining, indexing on the two existing holes which are normally occupied by the split resilient pin members. Preset locators and drill bushings (as part of the fixture) are positioned precisely over the new hole sites. A hydraulic drive drill motor, with correct drill and subsequently reaming cutters, machines the desired hole configuration in the upper core plate which the reinforcing pin members engage when the guide tube is installed. The second method of drilling of these new holes includes operating beneath the core plate, using existing pin holes for indexing the special fixtures and machine tools.

Additionally, the four pin system of the present invention can be used on new plant designs, as well as conversion and replacement in existing plants. Performing the required machining on unirradiated hardware in the machine shop is extremely simple and considerably less expensive than the underwater operations necessary in field conversion.

We claim:

1. In a nuclear reactor having a control rod guide tube and an upper core plate, a pintype mounting system for removably mounting a lower flange of said control rod guide tube over an opening in the upper core plate, said mounting system comprising:
   a pair of resilient pin members mounted on first opposing sides of the guide tube lower flange and resiliently and slidably receivable in a first pair of opposing bores formed in the upper core plate while mounted, said resilient pin members bearing substantially all of the usual shear load to which the guide tube is subjected; and
   a pair of reinforcing pin members mounted on second opposing sides of the guide tube lower flange and slidably receivable in a second pair of opposing bores formed in the upper core plate while mounted, said reinforcing pin members reinforcing said resilient pin members when the guide tube is subjected to an unusual shear load.

2. A mounting system according to claim 1 wherein said reinforcing pin members are mounted to bear substantially all of the unusual shear load to which the guide tube is subjected that exceeds the normal shear load.

3. A mounting system according to claim 1 wherein each of the first pair of opposing bores is oriented substantially 90° from each of the second pair of opposing bores.

4. A mounting system according to claim 1 wherein said reinforcing pin members are receivable in passages formed on the second opposing sides of the guide tube lower flange.

5. A mounting system according to claim 4 wherein each said reinforcing pin member includes a cap screw retainer and a mechanical locking device.

6. A mounting system according to claim 4 wherein each said reinforcing pin member comprises integrally formed mechanical locking detents.

7. A mounting system according to claim 4 wherein said lower flange passages are threaded and said reinforcing pin members each includes a threaded upper pin portion receivable in a respective threaded lower flange passage.

8. A mounting system according to claim 4 wherein each said reinforcing pin member and said guide tube lower flange have a cooperating transverse bore and said mounting system further comprises a locking rod engageable in said cooperating transverse bores to retain said reinforcing pin members in position.

9. A mounting system according to claim 2 wherein a clearance is provided between said reinforcing pin members and the second pair of opposing bores in the upper core plate such that said reinforcing pin members do not contact the walls of said second bores when the guide tube is subjected to the usual shear load.

10. A mounting system according to claim 9 wherein said resilient pin members are receivable in said first bores to permit deflection thereof when the guide tube is subject to shear loads, the amount of deflection being limited by the clearance between said reinforcing pin members and the walls of said second pair of bores.

11. A mounting system according to claim 9 wherein said reinforcing pin members contact the walls of the second pair of bores in the upper core plate only after said resilient pin members deflect the distance limited by the clearance between said reinforcing pin members and the walls of the second opposing pair of bores in the upper core plate, and said reinforcing pin members prevent the additional unusual shear loads from bearing on said resilient pin members.

12. A mounting system according to claim 1 wherein each said resilient pin member includes a first pin portion mounted on one of the first opposing sides of the guide tube lower flange and a second resilient pin portion receivable in one of said first bores.

13. A mounting system according to claim 12 wherein each first opposing side of the guide tube lower flange is formed with a passage, said first pin portion extending through said passage.

14. A mounting system according to claim 13 wherein said second resilient pin portion includes a plurality of leaf members, said leaf members providing a spring compression load to removably secure said resilient pin member with one of said first pair of bores in the upper core plate.

15. A mounting system according to claim 14 wherein said second resilient pin portion comprises two leaf members.

16. A mounting system according to claim 1 wherein said resilient pin members and said reinforcing pin members are located on the same bolt circle diameter.

17. In a nuclear reactor having a control rod guide tube and an upper core plate, a pintype mounting system for removably mounting a lower flange of a control rod guide tube over an opening in the upper core plate, said mounting system comprising:
   a pair of resilient pin members mounted on first opposing sides of the guide tube lower flange which are resiliently receivable in a first pair of bores formed on first opposing sides of the opening in the upper core plate to permit deflection thereof when the guide tube is subject to a usual shear load associated with the operation of the reactor, said resilient pin members bearing substantially all of the usual shear load to which the guide tube is subjected; and
   a pair of reinforcing pin members mounted on the second opposing sides of the guide tube lower flange and receivable in a second pair of bores formed on second opposing sides of the opening in the upper core plate, wherein a clearance is provided between the pin members and the bores such that said reinforcing pin members do not contact the walls of said second bores when the guide tube is subjected to the usual shear load, said reinforcing pin members bearing substantially all of the shear load that exceeds the usual shear load, wherein the clearance between said reinforcing pin members and said second pair of bores limits the deflection of said resilient pin members such that after said resilient pin members deflect the distance limited by the clearance said reinforcing pin members bear all additional shear load over said usual shear load and prevent the additional shear load from bearing on said resilient pin members.

18. A mounting system according to claim 17 wherein said reinforcing pin members are receivable in passages formed on the second opposing sides of the guide tube lower flange.

19. A mounting system according to claim 18 wherein each said reinforcing pin member comprises a cap screw retainer and a mechanical locking device.

20. A mounting system according to claim 18 wherein each said reinforcing pin member includes integrally formed mechanical locking detents.

21. A mounting system according to claim 18 wherein said lower flange passages are threaded and said reinforcing pin members each comprise a threaded upper pin portion receivable in a respective threaded lower flange passage.

22. A mounting system according to claim 18 wherein each said reinforcing pin member includes said guide tube lower flange have a cooperating transverse bore and said mounting system further comprises a locking rod engageable in said cooperating transverse bores to retain said reinforcing pin members in position.

23. A mounting system according to claim 17 wherein each said resilient pin member includes a first pin portion mounted on one of the first opposing sides of the guide tube lower flange and a second resilient pin portion receivable in one of said first pair of bores.

24. A mounting system according to claim 23 wherein each first opposing side of the guide tube lower flange is formed with a passage, said first pin portion extending through said passage.

25. A mounting system according to claim 24 wherein said second resilient pin portion comprises a plurality of leaf members, said leaf members providing a spring compression load to removably secure said resilient pin member within one of said first bores in the upper core plate.

26. A mounting system according to claim 25 wherein said second resilient pin portion comprises two leaf members.

27. A mounting system according to claim 17 wherein said resilient pin members and said reinforcing pin members are located on the same bolt circle diameter.

28. A mounting system according to claim 17 wherein each of the first opposing sides is oriented substantially 90° from each of the second opposing sides.

29. A mounting system according to claim 17 wherein said resilient pin members and said reinforcing pin members are formed of stainless steel.

30. A mounting system according to claim 29 wherein said resilient pin members and said reinforcing pin members are formed of cold worked 316 stainless steel.

31. A mounting system according to claim 17 further including lock nuts disposed on said resilient pin members to secure said resilient pin members in position.

32. In a nuclear reactor having a control rod guide tube and an upper core plate, a pin-type mounting system for removably mounting the lower flange of a control rod guide tube over an opening in said upper core plate, comprising:
- a pair of resilient pin members formed of stainless steel, mounted in passages formed through first opposing sides of the guide tube lower flange and resiliently and slidably receivable in a first pair of opposing bores formed on first opposing sides of the opening in the upper core plate to permit deflection thereof when the guide tube is subject to the usual shear loads associated with the operation of the nuclear reactor, said resilient pin members bearing substantially all of the usual shear load to which the guide tube is subjected, and each said resilient pin member including a first pin portion extending through one said passage and a second resilient pin portion receivable in one of said first pair of bores, said second resilient pin portion including two leaf members which provide a spring compression load to frictionally engage said resilient pin member within said one of said first pair of bores;
- a pair of reinforcing pin members formed of stainless steel mounted on second opposing sides of the guide tube lower flange and slidably receivable in a second pair of bores formed on second opposing sides of the opening in the upper core plate, a clearance being provided between said reinforcing pin members and said second pair of bores such that said reinforcing pin members do not contact the walls of said second pair of bores when the guide tube is subjected to the usual shear load, but wherein said reinforcing pin members bear substantially all of the unusual shear load applied to the guide tube, the clearance between said reinforcing pin members and said second pair of bores limiting the deflection of said resilient pin members such that after said resilient pin members deflect the distance limited by the clearance said reinforcing pin members bear all additional shear load applied to the guide tube and prevent the additional abnormal shear loads from bearing on said resilient pin members; and lock nuts disposed on each of said resilient pin members to secure said resilient pin members in position.

33. A mounting system according to claim 32 wherein said reinforcing pin members are receivable in passages formed on the second opposing sides of the guide tube lower flange.

34. A mounting system according to claim 33 wherein each said reinforcing pin member includes a cap screw retainer and a mechanical locking device.

35. A mounting system according to claim 33 wherein each said reinforcing pin member includes integrally formed mechanical locking detents.

36. A mounting system according to claim 33 wherein said lower flange passages are threaded and said reinforcing pin members each includes a threaded upper pin portion receivable in a respective threaded lower flange passage.

37. A mounting system according to claim 33 wherein each said reinforcing pin member and said guide tube lower flange have a cooperating transverse bore and said mounting system further comprises a locking rod engageable in said cooperating transverse bores to retain said reinforcing pin members in position.

38. A mounting system according to claim 32 wherein said resilient pin members and said reinforcing pin members are located on the same bolt circle diameter, and each of the first opposing sides of said flange of said guide tube is oriented substantially 90° from each of the second opposing sides.

39. A mounting system according to claim 32 wherein said resilient pin members and said reinforcing pin members are formed of cold worked 316 stainless steel.

* * * * *